(12) United States Patent
Löbbert

(10) Patent No.: US 7,496,101 B2
(45) Date of Patent: Feb. 24, 2009

(54) NETWORK TOPOLOGY AWARE CONFIGURATION OF NETWORK ADDRESSES IN WIRELESS PERSONAL AREA NETWORKS

(75) Inventor: Johannes Löbbert, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 854 days.

(21) Appl. No.: 10/732,033

(22) Filed: Dec. 9, 2003

(65) Prior Publication Data

US 2004/0120268 A1    Jun. 24, 2004

(30) Foreign Application Priority Data

Dec. 13, 2002    (EP)    ................. 02027948

(51) Int. Cl.
     *H04L 12/28*    (2006.01)
(52) U.S. Cl. ................... 370/395.54; 370/474
(58) Field of Classification Search ........... 370/332, 370/329, 344, 395.54, 474; 455/411; 709/245
     See application file for complete search history.

(56) References Cited

U.S. PATENT DOCUMENTS

| | | | |
|---|---|---|---|
| 5,745,699 A | | 4/1998 | Lynn et al. |
| 5,781,552 A | * | 7/1998 | Hashimoto ................. 370/447 |
| 6,061,739 A | * | 5/2000 | Reed et al. ................. 709/245 |
| 6,414,945 B1 | | 7/2002 | Chennakeshu et al. |
| 6,870,822 B2 | * | 3/2005 | Balogh ..................... 370/332 |
| 6,937,602 B2 | * | 8/2005 | Whitehill et al. ....... 370/395.54 |
| 7,006,467 B2 | * | 2/2006 | Anton et al. ................ 370/329 |
| 7,050,789 B2 | * | 5/2006 | Kallio et al. .............. 455/411 |

* cited by examiner

*Primary Examiner*—Hassan Kizou
*Assistant Examiner*—Emmanuel Maglo
(74) *Attorney, Agent, or Firm*—Oblon, Spivak, McClelland, Maier & Neustadt, P.C.

(57) ABSTRACT

In a method for configuring the network address for a node in a IP wireless network a network address is selected out of an available range of network addresses. At least one address resolution request (ARP) is sent over the network. A response to the ARP requests is awaited during a pre-defined timeout. In case no response is received from the network, the selected address is used to configure the node of the network.

According to the invention, this ZeroConf process is adapted to a network topology and link layer technology. Thereby, a plurality of pre-defined network topologies are used and the parameters of the ZeroConf process are adapted according to the decided network topology.

10 Claims, 3 Drawing Sheets

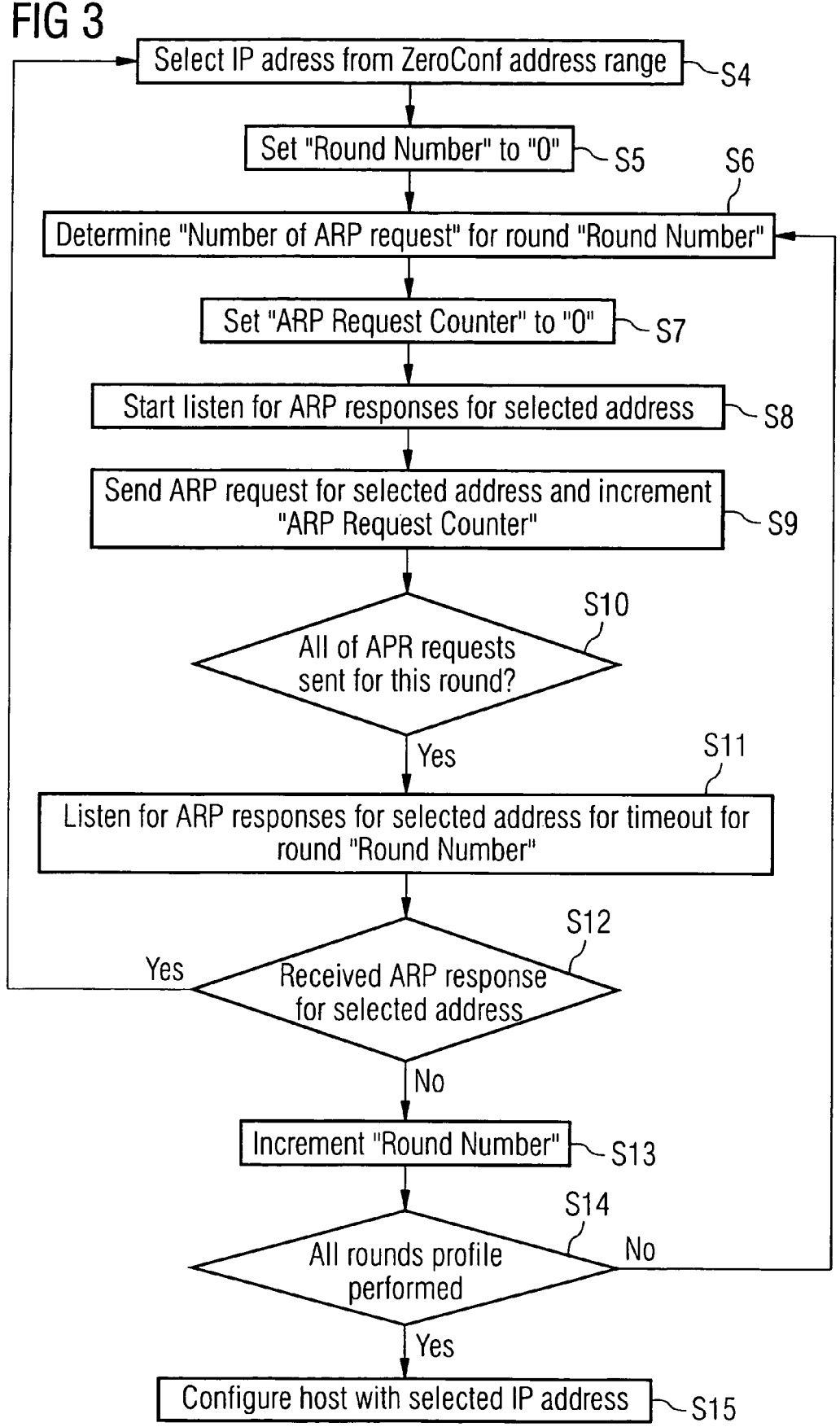

NETWORK TOPOLOGY AWARE CONFIGURATION OF NETWORK ADDRESSES IN WIRELESS PERSONAL AREA NETWORKS

The present invention generally proposes adaptations for an autonomous address configuration mechanism for wireless personal area networks such as e.g. Bluetooth Personal Area Networks.

In network technologies like Ethernet or Bluetooth network interface cards are pre-configured by the interface vendors with a unique layer 2 address. In order to participate in a communication network, each host, using a network interface card, must also be configured with the unique layer 3 address according to the OSI model.

In managed networks, the host sends a request to a central DHCP server and configures its IP stack with the IP address received in the answer packet from the DHCP server.

However, ad-hoc networks might not have access to backbone networks and no connectivity to a DHCP infrastructure. In this scenario the IP addresses can be configured manually by each user or autonomously by the host with a so-called ZeroConf mechanism e.g. described in the U.S. Pat. No. 6,061,739.

U.S. Pat. No. 6,061,739 relates to an initial network address configuration using physical address resolution protocol. A device attends a connection to the network, which causes address resolution (ARP) packets to be generated. The device monitors communications on a network for a specified number of unanswered ARP packets. Thereafter, the device adopts the network address in the unanswered ARP packets.

Using ZeroConf each host selects randomly an IP address from a preset range and sends out a number of ARP requests for the selected address. After the ARP request has been sent, the host listens for a specified waiting time, the so-called "timeout period". If the host receives no ARP reply during said timeout period, it assumes the selected address being unused and configures its own IP stack with said selected address. The mechanism according to the prior art recommends selecting the timeout periods pending on the link layer technology in a range from 200 milliseconds to 2 seconds.

The known mechanism of ZeroConf configuration thus describes a mechanism to configure automatically a unique link local IP address for IP-v4 without support from external infrastructure like e.g. DHCP servers in small ad-hoc networks. The ZeroConf specification describes the optimal messages sequence for switched wired network with low risk of packet losses, but possible delay due to forwarding delay on intermediate nodes in the network backbone.

ZeroConf performs the following steps:
1) Select randomly one IP address from the defined range 169.254.1.0 to 169.254.254.255,
2) Wait for a random time between zero and two seconds,
3) Send out four ARP requests for the selective address spaced two seconds apart. If an ARP response is received at any time during the process the host assumes the address as being taken by another node and restarts the mechanism of step 1,
4) If no ARP response has been received, wait for additional two seconds for an answer and assume otherwise the address as being free as a new link local address.

U.S. Pat. No. 6,101,499 teaches how to select an IP address which can be used e.g. in the above step 1. According to U.S. Pat. No. 6,101,499 first a proposed IP address is generated by selecting a network-identifying portion (sometimes known as IP network prefix) while deterministically generating the host-identifying portion based on information available to the IP host. For example, the IEEE 802 Ethernet address found in the network interface card may be used to in a deterministic hashing function to generate the host-identifying portion of the IP address. Next, the generated IP address is tested on the network to assure that no existing IP host is using that particular IP address. If the generated IP address already exists, then a new IP address is generated, otherwise, the IP host will use the generated IP address to communicate over the network. While using the generated IP address, if an IP address server subsequently comes available, the host will confirm to IP address server protocols for receiving an assigned IP address and gradually cease using the automatically generated IP address.

U.S. Pat. No. 6,101,499 thus teaches to deterministically generate at least a portion of the selected address in contrast to the random selection as proposed in the original ZeroConf mechanism.

The ZeroConf mechanism has been developed for a switched wired network (e.g. Ethernet) with low risk of packet losses but a potential for substantial delays. To take account of the possible delays, long timeouts and delays (e.g. two seconds) have been set, such that the overall process for configuring a host with a unique link local IP address can take up to e.g. twelve seconds. The known ZeroConf mechanism therefore has been specified for wire-based networks.

It is the object of the present invention to adapt the configuration process developed for wire-based networks to the needs of networks having wireless links.

Thereby, it is particularly the object of the invention to improve the process taking into account the constraints of wireless links. For example, in wireless Bluetooth networks the risk of a packet loss is higher than in wired networks, while the possible delays are shorter.

The object is achieved by means of the features of the independent claims. The dependent claims develop further the central idea of the present invention.

According to a first aspect of the invention therefore a method for configuring a network address for a node in a wireless network is proposed. Note that "wireless network" is to be understood that the network does comprise at least one wireless link from the node to be configured to an adjacent node. Other links of the network, if there are any, can be wire-based. At first a network address is selected out of an available range of network addresses. Then at least one address resolution request is sent out over the network. Further on, a response from the network is awaited indicating that another user already uses the selected address. In case no response indicating that the selected address is already used by another node of same network is received within a pre-defined waiting time, the selected network address is used. According to the invention, thereby beforehand is decided which network topology out of plurality of pre-defined network topologies is used. Then the parameters of sending the resolution request and waiting for the response from the network are adapted according to decided network topology.

The pre-defined network topologies can be respectively associated with a pre-defined parameter set, wherein, according to the decided network topologies the corresponding parameter set is used.

The network topology can e.g. be decided based on messages received from the network (e.g. in a service discovery process). Alternatively, the network topology can be decided by the node to be configured (e.g. the user of the node can manually select a network topology he wants to use for the future communication).

The parameters to be adapted can be at least one of the delay/waiting times and the number of requests sent.

The steps of sending at least one address resolution request and waiting for response from the network can be repeated for a predetermined number of the petition times. Said repetition number can also be adapted according to the decided network topology.

According to a further aspect of the present invention, the predefined network topologies can include at least one of:
a network comprising two wireless nodes only,
a network comprising more than two wireless nodes, wherein the nodes are able to communicate by using forwarding functionality in a master node of a network, and
a network comprising a plurality of wireless nodes able to communicate with the backbone network via a network access point.

According to a further aspect of the present invention, a configuration method is characterized in that a plurality of address resolution request is sent out essentially without any delay between two successive requests.

The network address selected can be selected randomly or pseudo-randomly out of the available range of addresses.

The network can comprise Bluetooth links.

Finally, the present invention proposes a mobile terminal having a processor with a protocol stack and a network card adapted to carry out such a method.

Further advantages, features and objects of the present invention will now be explained by reference to the figures of the enclosed drawings.

FIG. 3 shows an extended ZeroConfiguration (ZeroConf) mechanism according to the present invention.

In the following the invention will be explained with reference to the so-called "Bluetooth Personal Area Networks" using the IP protocol. However, it is to be noted that the present invention is not limited to IP networks, but can be adapted to any networking protocol and link layer technology adapted to support different network topologies.

The following explanation, however, describes the invention using IP based Bluetooth PANs as an example.

The present invention extends the known ZeroConf mechanism to adapt it not only to the underlying (physical) link layer technology, but also to the network topology in order e.g. to shorten the set-up time without introducing uncertainties about the result of the configuration process. Therefore according to the invention not only short-range information regarding the link the host is using is taken into account, but also information on the structure of the network.

The invention will now be described in more detail by reference to the Bluetooth radio system and Personal Area Network (PAN) profile as an example. However, the invention can be used in connection with other wireless technologies, as long as each node can make initial assumptions or decisions about the network topology used.

Figure 1A:
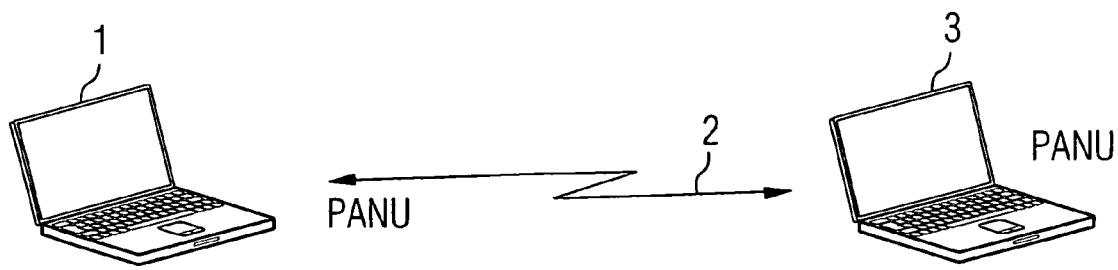
FIG. 1 shows examples for different network topologies
Figure 1B:
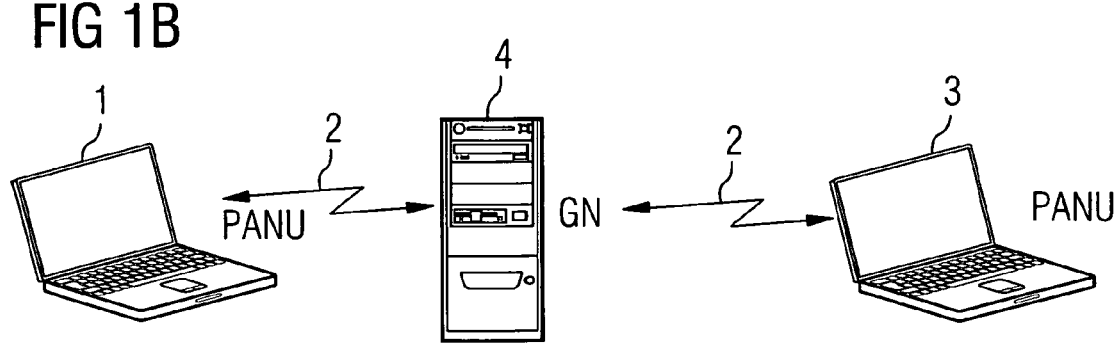
Figure 1C:
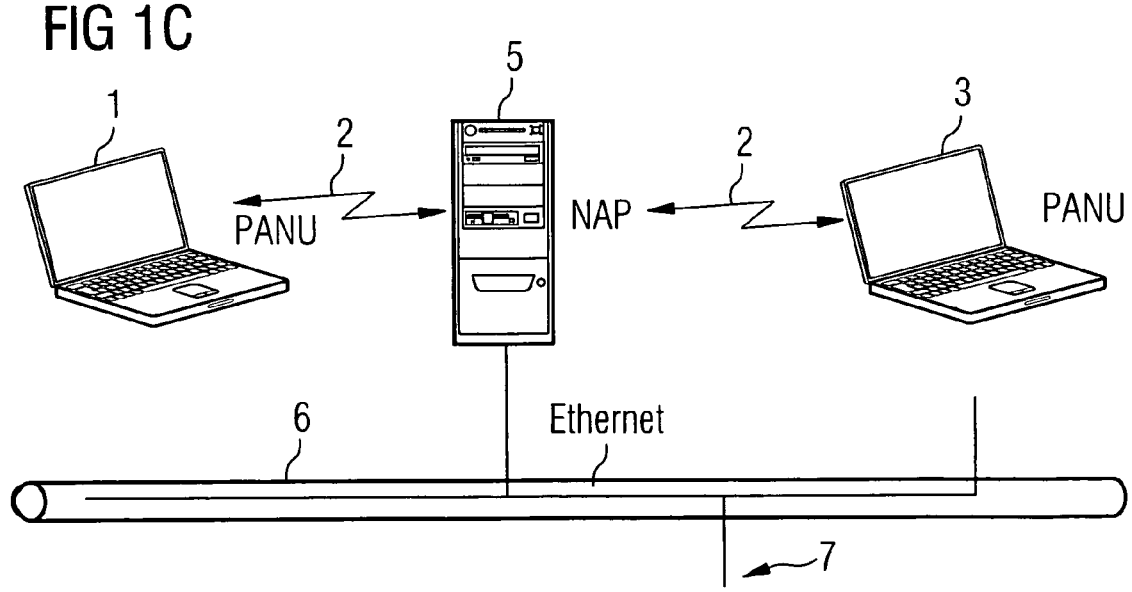

The Bluetooth PAN profiles specifies three different roles and describes combination of roles between which links can be established. Each combination maps to one the network topologies shown in FIG. 1.

Network Topology A: PANU-PANU Networks

A PANU-PANU network consists of only two nodes 1, 3 which are directly connected by means of a wireless link 2 and which have no additional Bluetooth PAN connections. Therefore, a host only has to check whether the other host has already chosen the same IP address from the available Zero-Conf IP address range.

Network Topology B: Group Networks

A group network node (GN) 4 connects multiple PANUs 1, 3 to one network and forward packets between the connected PANUs 1, 3. Group networks consist of a group network node 4 and up to e.g. seven connected Bluetooth slaves. A newly connecting host therefore has no knowledge about the number of hosts in the group network and the traffic patterns in the network.

Network Topology C: Network Access Point Networks

This type of network consists of a group of Bluetooth devices 1, 3, which can communicate with hosts 5 in the Bluetooth domain and hosts 7 in the backbone network 6 via a Network Access Point (NAP) 5. These networks consists of a Network Access Point 5, up to seven connected Bluetooth slaves and hosts connected to the additional backbone network segment of the network access point. Newly connecting hosts can make no assumptions about the topology of the backbone network.

According to the present invention, e.g. the three above network topologies are defined and parameters for the Zero-Conf process are predefined for each of the defined network topologies. A newly connecting host then can either decide itself which network topology with associated parameters set is to be used for the ZeroConf selection process or after detecting available topology information e.g. via the service discovery profile (SDP).

In order to minimize the configuration time for IP hosts in ad-hoc networks, the invention proposes to introduce multiple ZeroConf profiles to be used depending to the underlying link layer technology and network topology. A ZeroConf profile defines a set of parameters for specifying the Zero-Conf process to be used for the associated network topology and link layer technology. The corresponding steps will now be explained with reference to FIG. 2.

In a first step S1 the role of the local and the remote device and the resulting network topology are determined. This step can for example be carried out by means of a device inquiry and a service discovery process.

In a second step S2 a ZeroConf profile is selected according to the decided topology and/or link layer technology.

In a step S3 the ZeroConf profile selected is transferred to an extended ZeroConf entity.

Finally in a step S4 the extended ZeroConf process according to the present invention is started.

FIG. 3 shows the extended ZeroConf mechanism according to the present invention in more details. As shown in FIG. 3 mechanism is designed to perform multiple cycles. In each cycle the host starts to listen for IP name resolution responses for the initially selected IP address and send out a plurality of ARP requests to this address without delay. After the ARP requests have been sent out, the host waits for defined timeout period before assuming the address as free or performing additional rounds of ARP proving.

Now the single steps of the mechanism of FIG. 3 will be explained in more detail.

In a step S4 an IP address is selected from the ZeroConf address range. The ZeroConf address range is thereby predefined. The selection can e.g. be carried out using a random or pseudo-random selection process. Alternatively, deterministic selection procedures e.g. as shown in U.S. Pat. No. 6,101,499 can be used.

In a step S5 the "round number" is set to zero.

In a step S6 the "number of ARP requests" for "round number" is determined. Note that "number of ARP requests"

is one of the parameters of the parameter set to be adapted according to the link layer technology and network topology decided.

In a step S7 the "ARP request counter" is set to zero.

In a step S8 the nodes starts to listen for ARP responses for the address selected in step S4.

In a step S9 an ARP request for the selected address is sent out to the network and "ARP request counter" is implemented.

In a step S10 it is decided whether all ARP requests are sent out for this cycle without delay.

In case all ARP requests are sent out, in a step S11 the node listens for ARP responses for the selected address for the timeout for the round "round number". Note that the valley of the timeout for the listening in step S11 is a further parameter specified in the parameter set of the ZeroConf profile which is adapted according to the selected link layer technology and decided network topology.

In case in a step S11 an ARP response is received from the network during the timeout period of step S11, the procedure goes back to step S4 and a new IP address from the ZeroConf address range is selected.

In case during the timeout period specified no ARP response for the selected address is received from the network, the parameter "round number" is implemented in step S13. Note that the maximum value of "round number" is a further parameter of the parameter set of ZeroConf profile adapted according to the underlying link layer technology and network topology.

In a step S14 it is decided whether all round of the profile are performed. If the decision is negative, the procedure goes back to step S6.

If the decision in step S14 is positive, and all rounds of the profile have been performed, the host is configured with the IP address selected in step S15.

The ZeroConf profile is determined depending on the network topology and the used link layer technology and specifies how many ARP packets should be sent without delay in each round. This number can depend on the radio technology and the probability of packet losses. Because Bluetooth enables hosts using the PAN profiles are normally configured to try to send a packet only a limited time before a dropping the packet, each ARP message is sent a multiple of times. This might not be necessary for reliable radio technologies.

Figure 2:
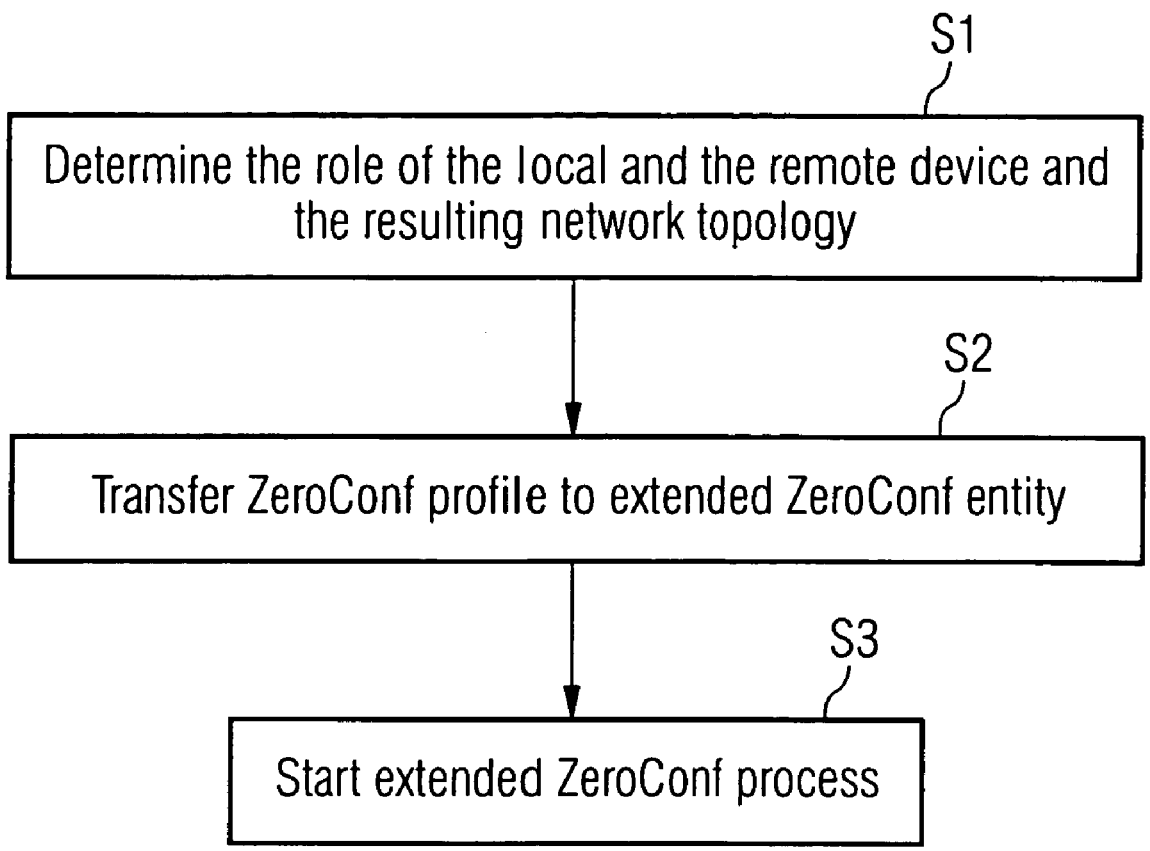
FIG. 2 shows the steps of a ZeroConfiguration (ZeroConf) profile selection process.

For the three different PAN topologies shown in FIG. 2, the following number of rounds, timeout periods and number of ARP packets according to the following ZeroConf profile are proposed:

PANU-PANU Networks

| Round Number | ARP Response Timeout | Number of ARP requests |
|---|---|---|
| 0 | 50 ms | 3 |

Group Networks

| Round Number | ARP Response Timeout | Number of ARP requests |
|---|---|---|
| 0 | 50 ms | 3 |
| 1 | 2 seconds | 3 |

Note that a plurality of ARP requests per round is sent due to the fact that a wireless link (e.g. Bluetooth) is used, packets might be lost on the wireless link. This is a major difference to the wired network topology for which ZeroConf has to be initially implemented.

The waiting time in round 2 could be reduced, if the GN maintains a list of connected nodes and their MAC address and answer the request in behave of the addressed node. But to guarantee, that the algorithm works correct, the PANU must ensure that the GN supports this functionality. This could be checked with an additional layer 2—message exchange before the actual IP configuration is performed.

Network Access Point Networks

| Round Number | ARP Response Timeout | Number of ARP requests |
|---|---|---|
| 0 | 2 seconds | 3 |
| 1 | 2 seconds | 3 |
| 2 | 2 seconds | 3 |

As has been shown above, it is the advantage of the present invention that the configuration process can be accelerated for network topologies having at least partial wireless network links. On the other hand, by sending out a plurality of ARP requests for cycle plurability of the process can be improved.

The invention claimed is:

1. Method for configuring a network address for a node in a wireless network, the method comprising the following steps:
   a.) selecting a network address out of an available range of network addresses,
   b.) start listening for address resolution protocol responses for the selected network address,
   c.) sending a number of address resolution protocol requests for the selected network address over the network,
   d.) waiting a defined waiting time for an address resolution protocol response from the network indicating that the selected address is already used by another user, and
   e.) using the selected network address in case within the defined waiting time no address resolution protocol response is received indicating that the selected address is already used by another node of the same network, characterized in that
   before step a.) it is decided which network topology out of a plurality of predefined network topologies is used and parameters of steps c.) and d.) including at least the number of address resolution protocol requests and the defined waiting time are adapted according to the decided network topology.

2. Method according to claim 1, characterized in that
the predefined network topologies each are associated with a parameter set including at least the number of address resolution protocol requests and the defined waiting time and according to the decided network topologies the corresponding parameter set is used in steps c.) and d.).

3. Method according to claim 1, characterized in that
the network topology is decided based on messages received from the network.

4. Method according to claim 1, characterized in that the network topology used is decided by the node to be configured.

5. Method according to anyone of claim 1, characterized in that
steps c.) and d.) are repeated for a predetermined number of repetitions.

6. Method according to claim 5, characterized in that
the number of repetitions of steps c.) and d.) is adapted according to the decided network topology.

7. Method according to claim 1, characterized in that
the predefined network topologies include at least one of:
a network comprising two wireless nodes only,
a network comprising two wireless nodes, wherein the nodes are able to communicate by using forwarding functionality in a master node, and
a network comprising a plurality of wireless nodes able to communicate with a backbone network via a network access point.

8. Method according to claim 1, characterized in that
the network address is selected randomly or pseudo-randomly out of the available range of addresses.

9. Method according to claim 1, characterized in that
the network comprises Bluetooth links.

10. Mobile terminal, characterized in that
it is adapted to carry out a method according to claim 1.

* * * * *